US008550216B2

(12) United States Patent
Ach

(10) Patent No.: US 8,550,216 B2
(45) Date of Patent: Oct. 8, 2013

(54) ELEVATOR SYSTEM HAVING A FLAT BELT WITH WEDGE-SHAPED RIBS

(75) Inventor: Ernst Ach, Ebikon (CH)

(73) Assignee: Inventio AG, Hergiswil (CH)

( * ) Notice: Subject to any disclaimer, the term of this patent is extended or adjusted under 35 U.S.C. 154(b) by 1079 days.

(21) Appl. No.: 12/403,026

(22) Filed: Mar. 12, 2009

(65) Prior Publication Data

US 2009/0166132 A1 Jul. 2, 2009

Related U.S. Application Data

(63) Continuation of application No. 10/585,563, filed as application No. PCT/EP2004/014723 on Dec. 27, 2004.

(30) Foreign Application Priority Data

Jan. 6, 2004 (EP) .................................... 04405008

(51) Int. Cl.

| | |
|---|---|
| ***B66B 11/08*** | (2006.01) |
| ***B66B 7/06*** | (2006.01) |
| ***B66B 11/00*** | (2006.01) |
| ***F16G 1/08*** | (2006.01) |
| ***D07B 1/22*** | (2006.01) |

(52) U.S. Cl.
USPC ........... 187/255; 187/251; 474/238; 474/252; 474/260

(58) Field of Classification Search
USPC .......... 187/251, 264, 266, 406, 404; 474/237, 474/260–263, 265, 252, 270, 247; 198/699, 198/810.04
IPC ....... B66B 11/08,7/06, 11/00, 7/00; D07B 1/06, D07B 1/16, 1/22
See application file for complete search history.

(56) References Cited

U.S. PATENT DOCUMENTS

| | | | | | |
|---|---|---|---|---|---|
| 2,444,583 | A * | 7/1948 | Stewart et al. | ................ | 474/262 |
| 2,526,324 | A * | 10/1950 | Bloomfield | .................... | 474/270 |
| 3,098,778 | A * | 7/1963 | Garner | .......................... | 474/252 |

(Continued)

FOREIGN PATENT DOCUMENTS

| | | | |
|---|---|---|---|
| EP | 1396458 | A2 * | 3/2004 |
| JP | 09021084 | A * | 1/1997 |
| WO | WO 2004071925 | A1 * | 8/2004 |
| WO | WO 2005094255 | A2 * | 10/2005 |

*Primary Examiner* — Michael Mansen
*Assistant Examiner* — Stefan Kruer
(74) *Attorney, Agent, or Firm* — Wolff & Samson, PC

(57) ABSTRACT

An elevator installation is provided that includes an elevator cage, a drive pulley, at least one support means formed as a flat belt, and a drive engine which drives the at least one support means, which carries the elevator cage, by way of the drive pulley. In the elevator installation, the support means has, at least on a running surface facing the drive pulley, several ribs of wedge-shaped or trapezium-shaped cross-section which extend parallel in a longitudinal direction of the support means and further has several tensile carriers oriented in the longitudinal direction of the support means. The tensile carriers are sized so that a total cross-sectional area of all the tensile carriers amounts to 30%-40% of a cross-sectional area of the support means. The tensile carriers may be distributed in a transverse direction of the support means so that exactly two tensile carriers are associated with each of the ribs, the tensile carriers having an outer diameter equal to 35%-40% of a rib spacing (T).

10 Claims, 2 Drawing Sheets

(56) References Cited

U.S. PATENT DOCUMENTS

| | | | | | |
|---|---|---|---|---|---|
| 4,534,162 | A * | 8/1985 | Riggs et al. | ..................... | 57/217 |
| 6,386,324 | B1 * | 5/2002 | Baranda et al. | ............... | 187/254 |
| 6,419,605 | B1 * | 7/2002 | Takahashi et al. | ............ | 474/237 |
| 6,609,990 | B2 * | 8/2003 | Kopang | ........................ | 474/264 |
| 2003/0069101 | A1 * | 4/2003 | Pitts et al. | ..................... | 474/260 |
| 2003/0121729 | A1 * | 7/2003 | Heinz et al. | ................... | 187/254 |
| 2005/0103573 | A1 * | 5/2005 | Marler et al. | ................. | 187/254 |
| 2008/0156592 | A1 * | 7/2008 | Thompson et al. | ........... | 187/411 |

* cited by examiner

Fig. 1
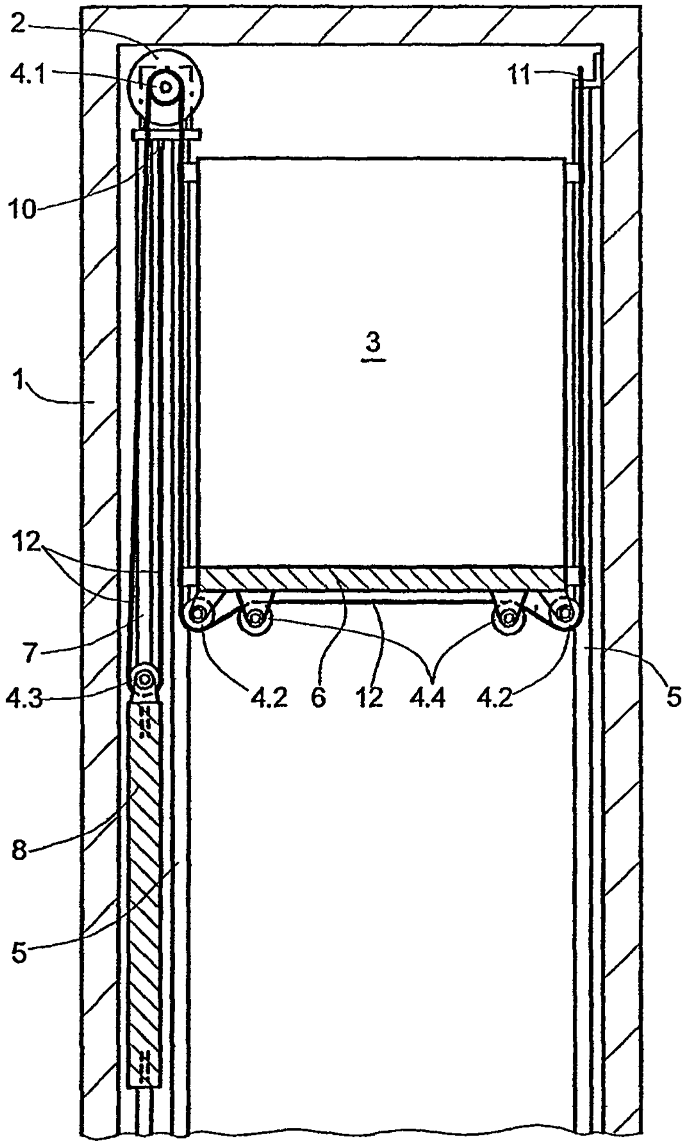
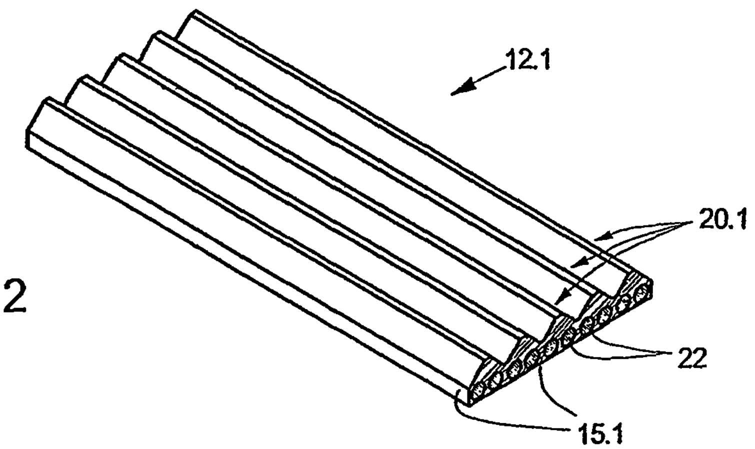
Fig. 2

ELEVATOR SYSTEM HAVING A FLAT BELT WITH WEDGE-SHAPED RIBS

CROSS-REFERENCE TO RELATED APPLICATIONS

The present application is a continuation of the co-pending patent application Ser. No. 10/585,563, filed Aug. 1, 2006, the entire contents of which are incorporated herein by reference, which claims priority to PCT/EP2004/014723, filed on Dec. 27, 2004, which claims priority to European Patent Application No. 04405008.6, filed on Jan. 6, 2004.

BACKGROUND OF THE INVENTION

The subject of the invention is an elevator installation.

Elevator installations of the kind according to the invention usually comprise an elevator cage and a counterweight, which are movable in an elevator shaft or along free-standing guide devices. For producing the movement the elevator installation comprises at least one drive with at least one respective drive pulley, which, by way of support means and/or drive means, support the elevator cage and the counterweight and transmit the required drive forces to these.

In the following, for the sake of simplicity the support means and/or drive means are termed only support means.

An elevator system without an engine room is known from WO 03/1043926, in which wedge ribbed belts are used as support means for the elevator cage. These belts comprise a belt body of flat belt form which is produced from a resilient material (rubber, elastomer) and which has, on its running surface facing the drive pulley, several ribs extending in the belt longitudinal direction. These ribs co-operate with grooves, which are formed to be complementary thereto, in the periphery of driving or deflecting pulleys (termed belt pulleys in the following) in order on the one hand to guide the wedge ribbed belt on the drive pulleys and on the other hand to increase the traction capability between the drive pulley and the support means. The ribs and grooves have triangular or trapezium-shaped, i.e. wedgeshaped, cross-sections. Tensile carriers consisting of metallic or non-metallic strands are embedded in the belt body of the wedge ribbed belt and oriented in the belt longitudinal direction, which tensile carriers impart the requisite tensile strength and longitudinal stiffness to the support means.

The wedge-ribbed belts known from WO 03/043926 have certain disadvantages, i.e. they are not optimally adapted to the requirements of a support means for eleavtor cages. Such support means have to have a high load-bearing capability and a low longitudinal elasticity for smallest possible dimensions and smallest possible own weight and in that case be able to be guided over driving and deflecting pulleys with smallest possible diameters.

The wedge ribbed belts used as support means in accordance with WO 03/043926 exhibit, by comparison with the cross-sections of the tensile carriers, relatively large cross-sections of the belt bodies, i.e. the thickness of the belt bodies is large in relation to the diameter of the tensile carriers, and the edge regions, which face the pulleys and rollers, of the belt bodies, particularly the tips of the wedge-shaped ribs, are spaced comparatively far from the tensile carriers. In the case of the cross-section, which is given by the required load-bearing strength, of the tensile carriers this means that the disclosed wedge ribbed belts on the one hand have more than the absolutely necessary amount of material for the belt body and thus are too heavy and too expensive. On the other hand, the material of the belt body, which is relatively high in bending direction, is needlessly strongly loaded by alternating bending stresses when the support means runs around a drive pulley or a deflecting roller of small diameter, which can lead to formation of cracks and premature failure of the support means. In particular, the regions of the belt body spaced far from the tensile carriers, i.e. the tips of the wedge-shaped ribs, are exposed to strong alternating bending stresses.

The present invention is based on the task of creating an elevator installation of the aforedescribed kind in which the stated disadvantages are not present, i.e. that the elevator installation comprises a support means of flat belt form with ribs, which in the case of use with minimum belt pulley diameters and for a predetermined load-bearing capability has minimum dimensions and minimum weight, wherein the tensile carriers and the belt body are exposed to the smallest possible loads so that an optimum service life is guaranteed for the support means.

Pursuant to this task, one aspect of the present invention resides in an elevator installation having a support means of flat belt form which has at least on a running surface facing the drive pulley several ribs extending parallel in the belt longitudinal direction, wherein at least two tensile carriers oriented in the belt longitudinal direction are present per rib and the sum of the cross-sectional areas of all tensile carriers amounts to at least 25%, preferably 30% to 40%, of the total cross-sectional area of the support means. For ascertaining the total cross-sectional area of the tensile carriers, the cross-section defined by the outer diameter thereof is to be taken into account.

Through the distribution of the load to two tensile carriers (with the requisite cross-section) per rib it is achieved that the tensile means when the support means runs over belt pulleys with small diameters are exposed to smaller alternating bending stresses than if a single tensile carrier with correspondingly larger diameter were used per rib. With the indicated relationship between the sum of the cross-sectional areas of all tensile carriers and the cross-sectional area of the support means there is defined a support means which has optimally small dimensions and material quantities. The optimum small dimensions also have the consequence of correspondingly small alternating bending stresses in the material of the belt body. Materials (rubber, lastomer) can therefore be selected for production of the belt body which have a lower permissible bending stress, but tolerate higher area pressures between tensile carriers and belt body.

According to a preferred refinement of the invention there are used in the support means tensile carriers with a substantially round cross-section, the outer diameter of which amounts to at least 30%, preferably 35% to 40%, of the rib spacing. As rib spacing there is to be understood the spacing between adjacent ribs of a support means, which is usually the same between all ribs of a specific support means. In the case of a support means constructed in accordance with this rule it is ensured that the forces which are to be transmitted by the tensile carriers via the belt body to a drive pulley or a deflecting roller are optimally distributed in the belt body and the area pressures arising between tensile carriers and belt body are optimally small. The risk is thereby minimised that a loaded tensile carrier cuts through the belt body.

Advantageously the ribs have a wedge-shaped cross-section with a flank angle of 60° to 120°, wherein the range of 80° to 100° is to be preferred. The angle present between the two side surfaces (flank) of a wedge-shaped rib is termed flank angle. With flank angles of 60° to 120° it is ensured on the one hand that when the support means runs over belt pulleys no jamming between the ribs and the grooves, which are formed to be complementary thereto, of the belt pulleys arises. Running noises as also excitation of vibrations of the wedge-ribbed belt are thereby reduced. On the other hand, with such flank angles a sufficient guidance of the support means on the belt pulleys can be achieved, which prevents the lateral displacement of the support means relative to the belt pulleys.

An ideal distribution of the forces introduced from the belt body into the tensile carriers is achieved inter alia in that the spacings between the centres of tensile carriers associated with a specific rib are at most 20% smaller than the spacings between the centres of adjacent tensile carriers associated with adjoining ribs.

Optimally small dimensions and low weight of the support means are achievable if the minimum spacing of the outer contour of a tensile carrier from a surface of a rib amounts to at most 20% of the total thickness of the support means. The total thickness of the belt body with the grooves is to be understood as total thickness.

According to a preferred refinement of the invention the tensile carriers associated with a rib are so arranged that a respective outer tensile carrier lies substantially in the region of the perpendicular projection of each flank of the wedge-shaped rib. A projection oriented perpendicularly to the plane of the flat side of the support means is termed perpendicular projection and by "substantially" there is to be understood that at least 90% of the cross-sectional area of the respective tensile carrier lies within the said projection.

In the case of a particularly advantageous form of embodiment a respective outer tensile carrier is arranged entirely in the region of the perpendicular projection (P) of each flank of a wedge-shaped rib.

With the two arrangements, defined in the foregoing, of the tensile carriers in the flank region it is guaranteed that when running around a belt pulley no tensile carrier has to be supported by that point of the belt body which has the deepest notching formed by the grooves lying between the ribs.

In order to obtain support means which for a given tensile loading have a smallest possible longitudinal stretching, tensile carriers of steel wire cables are used. Steel wire cables are less stretched, for the same loading, than, for example, tensile carriers with the same cross-section of conventional synthetic fibres.

A support means with particularly low permissible bending radii, which is suitable for use in combination with belt pulleys of small diameter, can be achieved in that the steel wire cables have an outer diameter of less than 2 millimetres and are twisted from several wires which in total contain more than 50 individual wires.

BRIEF DESCRIPTION OF THE DRAWINGS

Examples of embodiment of the invention are explained by reference to the accompanying drawings, in which:

FIG. 1 shows a section, which is parallel to a lift cage front, through a lift installation according to the invention;

FIG. 2 shows an isometric view of the rib side of a support means according to the invention in the form of a wedge ribbed belt;

DETAILED DESCRIPTION OF THE INVENTION

Figure 3:
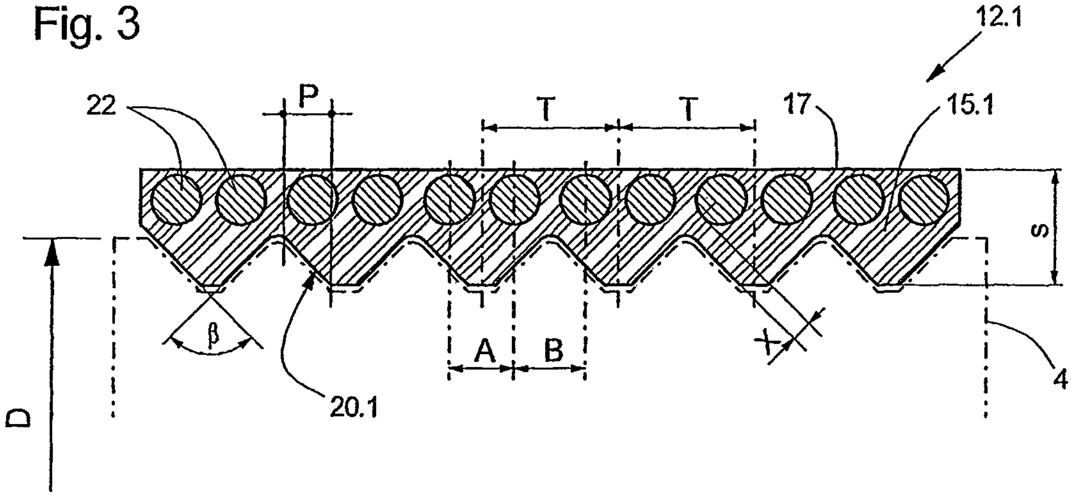
FIG. 3 shows a section through a first wedge ribbed belt forming the support means of the lift installation.

FIG. 1 shows a section through an elevator system according to the invention installed in an elevator shaft 1. Essentially illustrated are:

a drive unit 2, which is fixed in the elevator shaft 1, with a drive pulley 4.1;

an elevator cage 3, which is guided at cage guide rails 5, with cage support rollers 4.2 mounted below the cage floor 6;

a counterweight 8, which is guided at counterweight guide rails 7, with a counterweight support roller 4.3; and a support means, which is constructed as a wedge ribbed belt 12, for the elevator cage 3 and the counterweight 8, which support means transmits the drive force from the drive pulley 4.1 of the drive unit 2 to the elevator cage and the counterweight. (In the case of an actual elevator installation, at least two wedge ribbed belts arranged in parallel are present).

The wedge ribbed belt 12 serving as support means is fastened at its end below the drive pulley 4.1 to a first support means fixing point 10. From this it extends downwardly to the counterweight support roller 4.3, loops around this and extends out from this to the drive pulley 4.1, loops around this and runs downwardly along the cage wall at the counterweight side, loops around, at both sides of the elevator cage, a respective cage support roller 4.2, which is mounted below the elevator cage 3, in each instance by 900 and runs upwardly along the cage wall remote from the counterweight 8 to a second support means fixing point 11.

The plane of the drive pulley 4.1 is arranged at right angles to the cage wall at the counterweight side and its vertical projection lies outside the vertical projection of the elevator cage 3. It is therefore important that the drive pulley 4.1 has a small diameter, so that the spacing between the cage wall at the left side and the wall of the elevator shaft 1 opposite thereto can be kept as small as possible. Moreover, a small drive pulley diameter enables use of a drive motor without transmission and with a relatively small drive torque as drive unit 2.

The drive pulley 4.1 and the counterweight support roller 4.3 are provided at their periphery with grooves which are formed to be complementary to the ribs of the wedge ribbed belt 12. Where the wedge ribbed belt 12 loops around one of the belt pulleys 4.1 and 4.3 its ribs lie in corresponding grooves of the belt pulley, whereby a perfect guidance of the wedge ribbed belt on these drive pulleys is guaranteed. Moreover, the traction capability is improved by the wedging action arising between the grooves of the belt pulley 4.1 serving as drive pulley and the ribs of the wedge ribbed belt 12.

In the case of support means under-looping below the elevator cage 3 no lateral guidance is given between the cage support rollers 4.2 and the wedge ribbed belt 12, since the ribs of the wedge ribbed belt are disposed on its side remote from the cage support rollers 4.2. In order to nevertheless ensure lateral guidance of the wedge ribbed belt there are mounted at the cage floor 6 two guide rollers 4.4 provided with grooves which co-operate with the ribs of the wedge ribbed belt 12 as lateral guidance.

FIG. 2 shows a section of a wedge ribbed belt 12.1, which serves as support means, of an elevator installation according to the invention. The belt body 15.1, the wedge-shaped ribs 20.1 and the tensile carriers 22 embedded in the belt body can be recognised.

FIG. 3 shows a cross-section through a wedge ribbed belt 12.1 according to the present invention, which comprises a belt body 15.1 and several tensile carriers 22 embedded therein. The belt body 15.1 is produced from a resilient material. Natural rubber or a number of synthetic elastomers are, for example, usable. The flat side 17 of the belt body 15.1 can be provided with an additional cover layer or a fabric layer which is worked in. The traction side, which co-operates at least with the drive pulley 4.1 of the drive unit 2, of the belt body 15.1 has several wedge-shaped ribs 20.1 which extend in the longitudinal direction of the wedge ribbed belt 12.1. A belt pulley 4, in the periphery of which grooves complementary to the ribs 20.1 of the wedge ribbed belt 12.1 are formed, is indicated by means of phantom lines.

Two round tensile carriers 22 are associated with each of the wedge-shaped ribs 20.1 of the wedge ribbed belt 12.1 and are so dimensioned that they can in common transmit the belt loads arising in the wedge ribbed belt per rib. These belt loads are on the one hand the transmission of pure tensile forces in the belt longitudinal direction. On the other hand, in the case of looping around of a belt pulley 4.1-4.4 forces are transmitted in radial direction from the tensile carriers via the belt body to the belt pulley. The cross-sections of the tensile carriers 22 are so dimensioned that these radial forces do not cut through the belt body 15.1. In the case of looping around of a belt pulley additional bending stresses arise in the tensile carriers as a consequence of the curvature of the wedge ribbed belt resting on the belt pulley. In order to keep these additional bending stresses in the tensile carriers 22 as small as possible the forces to be transmitted per rib 20.1 are distributed to two tensile carriers, although a single tensile carrier arranged in the centre of the rib would enable a somewhat smaller overall thickness of the wedge ribbed belt.

Through extensive tests there has been ascertained an arrangement of belt body 15.1 and tensile carriers 22 which, for a given belt pulley diameter D of approximately 90 millimetres, a given tensile load and a given permissible alternating bending stress of the tensile carriers and the belt body material, a smallest possible total cross-section for a smallest possible weight of the wedge ribbed belt results. As an important criterion for a wedge ribbed belt with the stated properties it has in that case resulted that the proportion of the total cross-sectional area of all tensile carriers to the cross-sectional area of the wedge ribbed belt shall amount to at least 25%, preferably 30% to 40%.

The wedge ribbed belt illustrated in FIG. 3 fulfils this criterion. For ascertaining the total cross-sectional area of all tensile carriers the cross-section, which is defined by outer diameter DA shown in FIG. 5, of the wire cable is to be taken into consideration.

In the case of a wedge ribbed belt 12.1 with two tensile carriers per rib 20.1 the aforesaid characteristics are achieved in particularly optimal manner if the outer diameter of a tensile carrier amounts to at least 30% of the rib spacing. The uniform pitch spacing T of the ribs is termed rib spacing.

Figure 4:
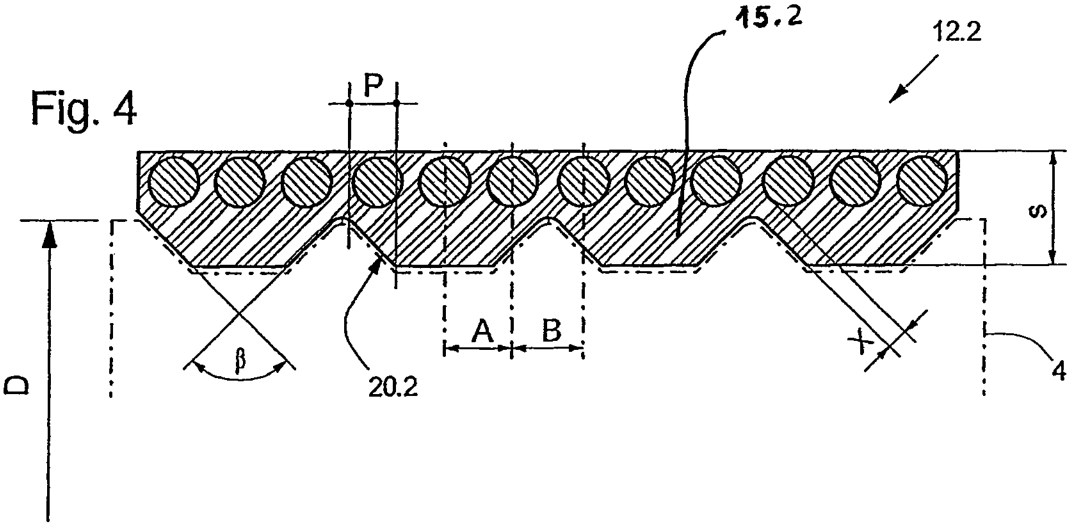
FIG. 4 shows a section through a second wedge ribbed belt forming the support means of the lift installation.

FIG. 4 shows a variant 12.2 of the wedge ribbed belt, in which the wedge-shaped ribs 20.2 are wider than in the case of the variant 12.1 illustrated in FIG. 3 and each have three associated tensile carriers. All other characteristics stated in connection with the variant according to FIG. 3 are similarly present in the case of this variant. Such a wedge ribbed belt has the advantage that the corresponding belt pulleys 4.1, 4.3, 4.4 are somewhat easier to produce.

The wedge ribbed belts illustrated in FIGS. 3 and 4 and serving as support means have a preferred flank angle 13 of approximately 90°. The angle present between the two flanks of a wedge-shaped rib of the belt body is termed flank angle. As already explained in the description of advantages, tests have shown that the flank angle has a critical influence on the development of noise and the creation of vibrations and that flank angles β of 80° to 100° are optimal, and from 60° to 120° usable, for a wedge ribbed belt provided as elevator support means.

It is also recognisable in FIGS. 3 and 4 that the spacings A between centres of the tensile carriers 22 associated with a specific rib are slightly smaller than the spacings B between centres of adjacent tensile carriers of adjoining ribs. This is caused by the maintenance of a minimum requisite spacing of the tensile carriers 22 from the edges of the ribs 20.1, 20.2. In that the difference's in the spacings are kept as small as possible, a homogeneous distribution of the forces introduced by the belt body into the tensile carriers is guaranteed. It has proved advantageous if the spacings A are not more than 20% smaller than the spacings B.

Moreover, it can be inferred from FIGS. 3 and 4 that small dimensions and low weight of the wedge ribbed belt can be achieved in that the spacings X between the outer contours of the tensile carriers and the surfaces of the ribs are formed to be as small as possible. Tests have yielded optimum characteristics for wedge ribbed belts in which these spacings X amount to at most 20% of the total thickness s of the support means or at most 17% of the pitch spacing T present between the ribs 20.1, 20.2. The total thickness of the belt body 15.1, 15.2 together with the ribs 20.1, 20.2 is to be understood as total thickness s.

Particularly small dimensions and good running characteristics have resulted for wedge ribbed belts 12.1, 12.2 when the tensile carriers 22 associated with a rib 20.1, 20.2 are so arranged that a respective outer tensile carrier lies substantially or entirely in the region of the perpendicular projection P of each flank of the wedge-shaped rib 20.1, 20.2.

Figure 5:
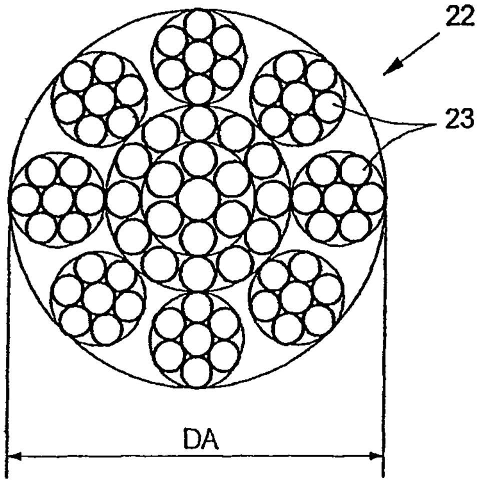
FIG. 5 shows a cross-section through a steel wire tensile carrier of the wedge ribbed belt.

FIG. 5 shows in enlarged illustrated a cross-section through a preferred form of embodiment of a tensile carrier 22, which is predominantly suitable for a wedge ribbed belt for use in an elevator installation according to the invention. The tensile carrier 22 is a steel wire cable which is twisted from in total 75 individual wires 23 with extremely small diameters.

In order to achieve a long service life of the support means in elevator installations with belt pulleys of small diameter it is of substantial advantage if the steel wire cables used as tensile carriers 22 consist of at least 50 individual wires.

The invention claimed is:

1. An elevator installation, comprising:

an elevator cage;

a drive pulley;

at least one support means formed as a flat belt; and a drive engine which drives the at least one support means, which carries the elevator cage, by way of the drive pulley, wherein the support means has, at least on a running surface facing the drive pulley, several ribs of wedge-shaped or trapezium-shaped cross-section which extend parallel in a longitudinal direction of the support means and further has several tensile carriers oriented in the longitudinal direction of the support means, wherein the tensile carriers are sized so that a total cross-sectional area of all the tensile carriers amounts to 30%-40% of a cross-sectional area of the support means.

2. The elevator installation according to claim 1, wherein the size of the tensile carriers relative to the support means provides a reduced thickness of the support means and reduced bending stress in a material of a belt body.

3. The elevator installation according to claim 1, wherein spacings (A) between centers of two tensile carriers associated with a rib are smaller than spacings (B) between the centers of adjacent tensile carriers associated with two adjoining ribs.

4. The elevator installation according to claim 1, wherein an outer diameter of a tensile carrier amounts to at least 30% of a rib spacing (T).

5. The elevator installation according to claim 1, wherein a minimum spacing (X) between an outer contour of a tensile carrier and a surface of a rib amounts to at most 20% of a total thickness of the support means.

6. An elevator installation, comprising:

an elevator cage;

a drive pulley;

at least one support means formed as a flat belt; and a drive engine which drives the at least one support means, which carries the elevator cage, by way of the drive pulley, wherein the support means has, at least on a running surface facing the drive pulley, several ribs of wedge-shaped or trapezium-shaped cross-section which extend parallel in a longitudinal direction of the support means and further has several tensile carriers oriented in the longitudinal direction of the support means, the tensile carriers being sized so that a total cross-sectional area of all the tensile carriers amounts to at least 30% of a cross-sectional area of the support means, wherein the tensile carriers are distributed in a traverse direction of the support means so that exactly two tensile carriers are associated with each of the ribs, the tensile carriers having an outer diameter equal to 35%-40% of a rib spacing (T).

7. The elevator installation according to claim 6, wherein the size of the outer diameter of the tensile carriers relative to the rib spacing avoids that a loaded tensile carrier cuts through a belt body.

8. The elevator installation according to claim 6, wherein spacings (A) between centers of two tensile carriers associated with a rib are smaller than spacings (B) between the centers of adjacent tensile carriers associated with two adjoining ribs.

9. The elevator installation according to claim 6, wherein an outer diameter of a tensile carrier amounts to at least 30% of a rib spacing (T).

10. The elevator installation according to claim 6, wherein a minimum spacing (X) between an outer contour of a tensile carrier and a surface of a rib amounts to at most 20% of a total thickness of the support means.

* * * * *